E. L. KELLY.
Grain Separator and Clover Cleaning Machine.
No. 93,450. Patented Aug. 10, 1869.
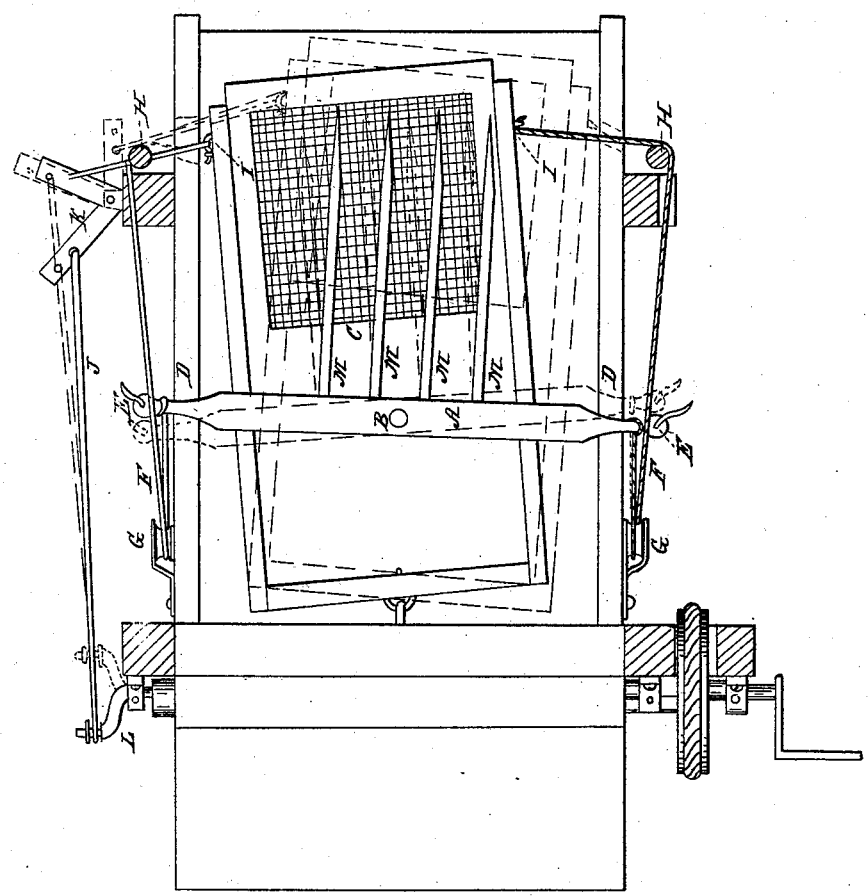
Witnesses:
Inventor:

United States Patent Office.

EBENEZER L. KELLY, OF READING, MICHIGAN.

Letters Patent No. 93,450, dated August 10, 1869.

IMPROVEMENT IN GRAIN-SEPARATORS AND CLOVER-CLEANING MACHINE.

The Schedule referred to in these Letters Patent and making part of the same.

*To whom it may concern:*

Be it known that I, EBENEZER L. KELLY, of Reading, in the county of Hillsdale, and State of Michigan, have invented a new and useful Improvement in Grain-Separators and Clover-Cleaning Machines; and I do declare that the following is a true and accurate description thereof, reference being had to the accompanying drawings, and to the letters of reference marked thereon, and being a part of this specification.

The nature of this invention relates to an improvement in grain-separators and clover-cleaning machines, by means of which damp or wet grain may be prevented from clogging the sieves.

It consists in a series of fingers, so arranged that they will vibrate upon the top of the upper sieve in an opposite direction from the motion of the sieve.

A, in the drawing, represents a bar, pivoted, at B, near the head of the sieve C, and near the throat of the hopper which delivers the grain upon the sieve.

The ends of the bar A should project through each wall, D, of the case of the separator, as at E.

F are cords, which are attached, at E, to the ends of the bar A, outside of the walls D of the case, thence, passing around the sheaves G, (which are attached to the walls of the separator,) and thence over the friction-rollers H, are attached to or near the rear end of the sieve, at I.

J is a connecting-rod, connecting the bell-crank K (which is secured, by a shorter rod, to the sieve C) and the crank L, at the end of the fan-shaft, from which motion is given to the sieve, and communicated from the sieve to the vibrating bar A, by means of the cords F, above described.

M are fingers, rigidly attached to the bar A, and long enough to sweep the length of the sieve C, and prevent the same from being clogged by wet or damp grain and straw.

By means of the bell-crank and connecting-rod heretofore mentioned, a vibrating motion is given to the sieve, which communicates a similar motion, in an opposite direction, to the bar and fingers, by means of the cords F.

What I claim as my invention, and desire to secure by Letters Patent, is—

The arrangement of the vibrating bar A with the cords F, sheaves G, friction-rollers H, and sieve C, in any grain-separator or clover-cleaning machine, when operating substantially as and for the purposes herein described.

EBENEZER L. KELLY.

Witnesses:
GEORGE RUHLANDT,
LOUIS C. HYDE.